US006813898B2

(12) United States Patent
Lindsay et al.

(10) Patent No.: US 6,813,898 B2
(45) Date of Patent: Nov. 9, 2004

(54) REFRIGERATED AIR FREIGHT CONTAINER

(76) Inventors: Leslie John Lindsay, 47 Miles Grove, Seaford, Victoria (AU), 3198; Christopher Robin Hill, 10 Raglan Street, South Melbourne, Victoria (AU), 3205

(*) Notice: Subject to any disclaimer, the term of this patent is extended or adjusted under 35 U.S.C. 154(b) by 0 days.

(21) Appl. No.: 10/463,832

(22) Filed: Jun. 16, 2003

(65) Prior Publication Data

US 2004/0035139 A1 Feb. 26, 2004

Related U.S. Application Data

(63) Continuation-in-part of application No. 10/052,471, filed on Jan. 17, 2002, now abandoned.

(51) Int. Cl.[7] ............................ F25B 1/00; F25B 49/00; F25B 27/00

(52) U.S. Cl. ...................... 62/228.4; 62/236; 62/DIG. 5

(58) Field of Search ................................ 62/228.4, 230, 62/448, 239, DIG. 5, 236, 331, 371, 457.9

(56) References Cited

U.S. PATENT DOCUMENTS 3,589,139 A * 6/1971 Arthur ......................... 62/115
3,864,936 A * 2/1975 Frank et al. .................. 62/385
4,409,528 A * 10/1983 Podell ........................ 318/246
4,901,538 A * 2/1990 Anthony ...................... 62/237
5,363,670 A * 11/1994 Bartilucci .................... 62/166
5,899,085 A * 5/1999 Williams ..................... 62/236
5,953,928 A * 9/1999 Saia et al. .................... 62/239

FOREIGN PATENT DOCUMENTS

DE 4411922 A1 * 6/1995 ............. B60P/3/20
DE 2961821 U1 * 5/1997 ........... B65D/81/38
FR 2726255 A1 * 5/1996 ........... B65D/88/74
WO WO 85/01274 A * 3/1985 ........... B65D/88/74

* cited by examiner

*Primary Examiner*—Marc Norman
(74) *Attorney, Agent, or Firm*—Thomas R. Vigil; Welsh & Katz, Ltd.

(57) ABSTRACT

An electrically powered air freight container (1) includes an insulated housing (2) and a refrigeration unit (3).

The refrigeration unit (3) is powered by a voltage and frequency converter which receives electrical power either aircraft generated from either an airport ground source of power or an aircraft source of power which is appropriate to power the refrigeration unit (3)

The refrigeration unit (3) is powered by a voltage and frequency converter which receives either airport power at 240 volt or 115 volt or aircraft power at 115 volt (400 Hz) and converts the supply to a voltage and frequency appropriate to power the refrigeration unit (3).

The air contained in the housing is free to expand in the event of rapid depressurisation by the provision of blow out covers (19) which close ducts (15).

8 Claims, 8 Drawing Sheets

16 17 18 18 20 20 15 19 27 16 17 18 18 20 20 15 19 13

13
15
16
16
17
18
18
18
19
20
20

REFRIGERATED AIR FREIGHT CONTAINER

This is a continuation-in-part of Ser. No. 10/052,471, filed Jan. 17, 2002, now abandoned.

FIELD OF THE INVENTION

The present invention relates to refrigerated freight containers to be carried by aircraft. In particular, the invention relates to such containers wherein the contents of the container may be refrigerated while the container is both within the aircraft and while the container is on the ground in transit to or from an aircraft.

BACKGROUND OF THE INVENTION

A number of attempts have been made to produce a refrigerated aircraft freight container which will operate while in an aircraft and while in transit on the ground.

U.S. Pat. No. 3,889,486 to Grayson W. Hinckley discloses a removable refrigeration system which uses dry ice. Insulation panels line the interior surfaces of the cargo container and support each other so that no connections between the panels and the cargo container are necessary. The panel lining the door of the cargo container is forced against the other insulation panels by the force used to close the door of the cargo container, forming an enclosed space sealed from the atmosphere. A box carrying dry ice is carried in a corner of the enclosed space and is insulated from the bulk of the enclosed space. Inlet and outlet ports allow air to flow over the box. A slidable cover is provided over the outlet port to regulate the amount of air flowing around the box.

U.S. Pat. No. 4,276,752 to Peter R. Modler, et. al. discloses an insulated container with an insulated bunker which includes a heat exchanger portion located within one of the two corners of the freight container. The bunker holds a coolant, such as dry ice. Vapour from the coolant is vented to the outside of the container.

U.S. Pat. Nos. 5,473,908 and 5,819,550 to Louis P. Saia and Russell Andrews discloses transportable containers which are cooled by the boiling off of a liquid refrigerant.

U.S. Pat. No. 5,491,979 to Harald Kull et. al. discloses a refrigerated food trolley for an aircraft. The trolley has a heat exchange surface directly connected to a coolant flow circuit in the trolley. When the trolley is parked in a parking space, for example in an aircraft galley, the heat exchange surface of the trolley is in heat exchange contact with a heat exchanger connected to a central refrigerant circuit in the aircraft.

U.S. Pat. No. 5,369,960 to Hans-Juergen Mueller, et. al. discloses an insulated container including a coolant circuit, which circuit is connected to a source of coolant fluid within the aircraft.

International Patent Application No. W85/01274 (Bjork) discloses an airfreight container made of insulating material covered with sheet aluminum cooled by a refrigeration circuit which is powered in flight by 24 volt batteries.

In contrast, the present invention seeks to provide a refrigerated aircraft freight container which can be used both in an aircraft and removed from the aircraft, and which does not need to be charged with solid or liquid refrigerants or which relies on battery current. FAA and IATA regulations impose strict performance specifications on air freight equipment. Accordingly, it is difficult to design for such end use. Failure to meet all regulatory controls results in refusal of certification and entry to the aircraft.

The present invention also seeks to provide a refrigerated aircraft freight container which does not require connections to a refrigerant source mounted in the aircraft but utilises the three phase 115 volt/400 Hz power available in the aircraft to balance the load on the aircraft alternators.

SUMMARY OF THE INVENTION

The present invention accordingly provides a refrigerated air freight container which includes:

- an insulated housing having an interior region;
- a refrigerator unit which is mounted on the housing for refrigerating the interior region of the housing, which refrigerator unit includes:
  - at least one electrically powered compressor which operates at a given power supply voltage and frequency;
  - evaporator means; and
  - condenser means,
- the refrigerated air freight container further including a voltage and frequency converter which receives electrical power at a first voltage and frequency and converts that electrical power to a second voltage and frequency which is the given power supply voltage and frequency of the compressor, the housing defining a duct joining the interior region with the exterior surrounding the container, an insulated blow out panel which in use closes the duct and means in the duct to locate and retain the panel until a pressure difference between the interior and the exterior region overcomes the retention and displaces the panel.

PREFERRED FEATURES OF THE INVENTION

Preferably, the fist voltage which is received by the voltage converter may be within a range of voltages.

Preferably that range of voltages includes 240 volts and 115 volts.

Preferably, the first frequency which is received by the voltage converter may be within a range of frequencies.

Preferably, the second voltage and frequency may be direct current.

It is also preferred that the refrigerator unit is removably mounted on the housing.

In order that the invention may be more readily understood, preferred embodiments of it will now be described with reference to the drawings.

DESCRIPTION OF PREFERRED EMBODIMENTS OF THE INVENTION

Figure 1:
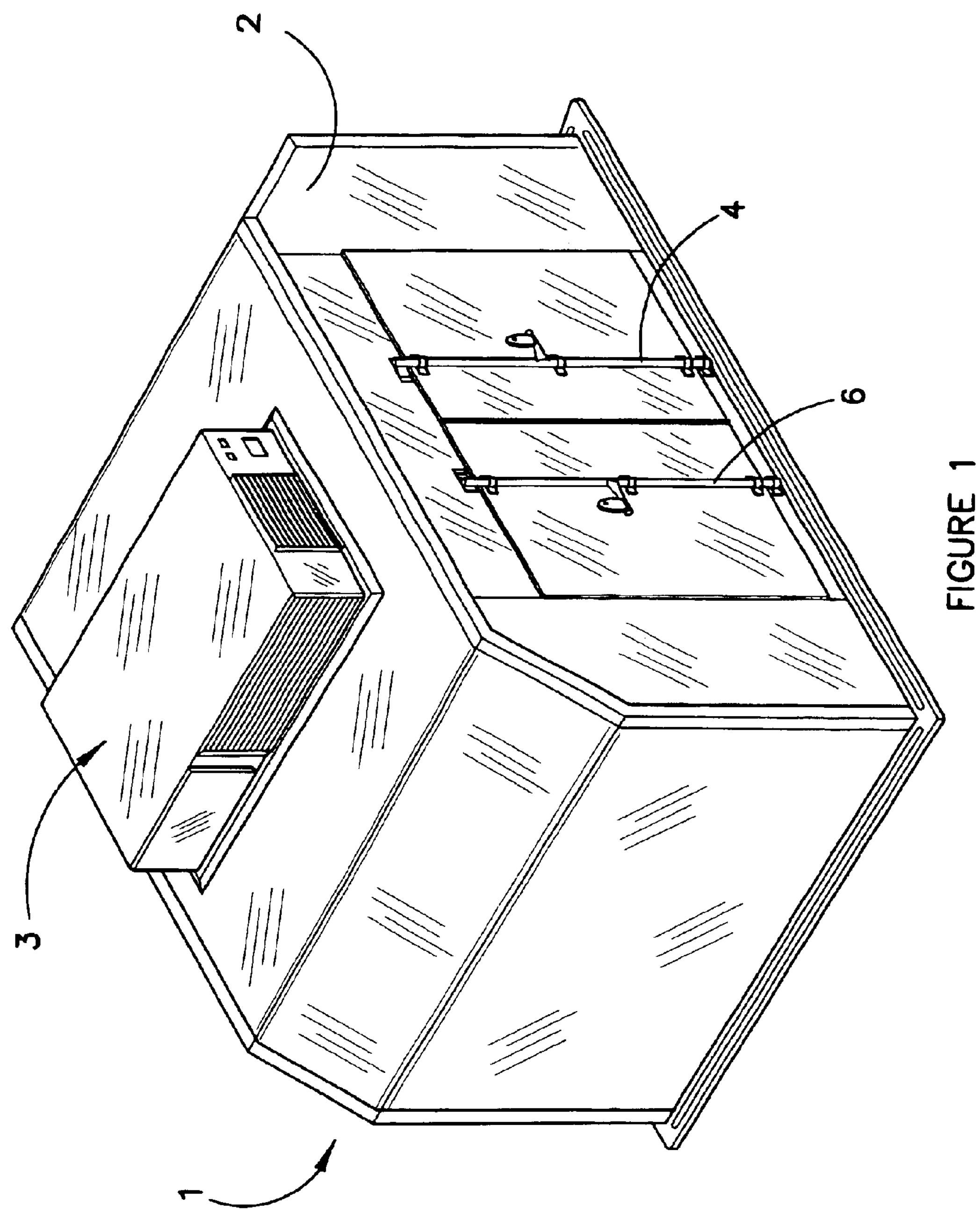
FIG. 1 is an isometric view of a refrigerated air freight container according to one embodiment of the present invention.

FIG. 1 shows a refrigerated air freight container 1.

The container 1 includes an insulated housing 2 and a refrigerator unit 3. In the present embodiment of the invention, the refrigerator unit 3 is readily detachably mounted to the insulated housing 2 as described below.

In alternative preferred embodiments of the invention, the refrigerator unit 3 is permanently attached to the insulated housing 2.

Figure 2:
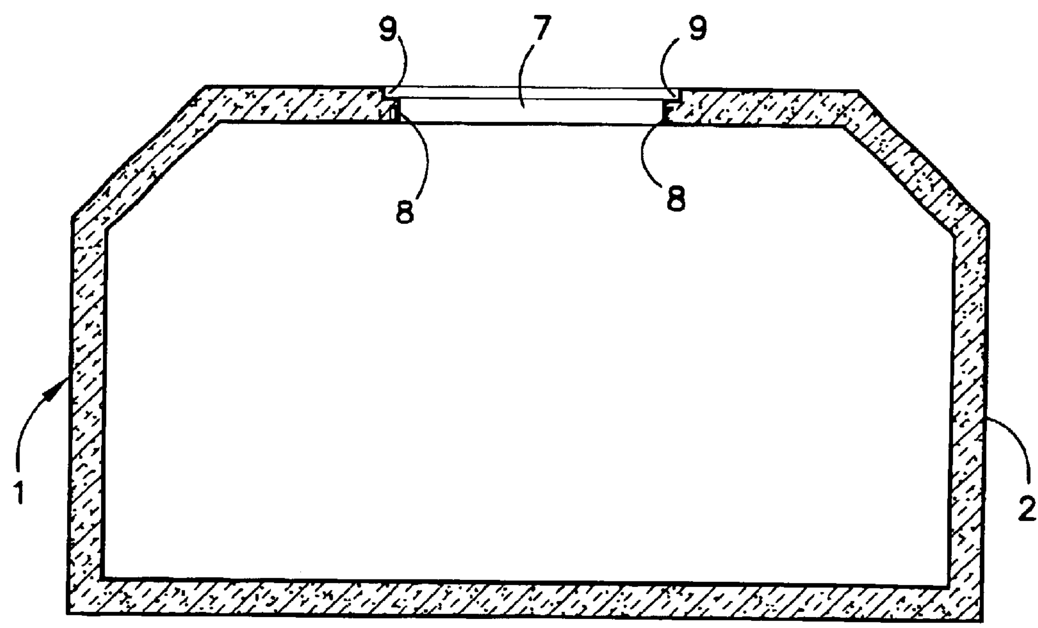
FIG. 2 is a cross-sectional view of the insulated housing of FIG. 1.
Figure 3:
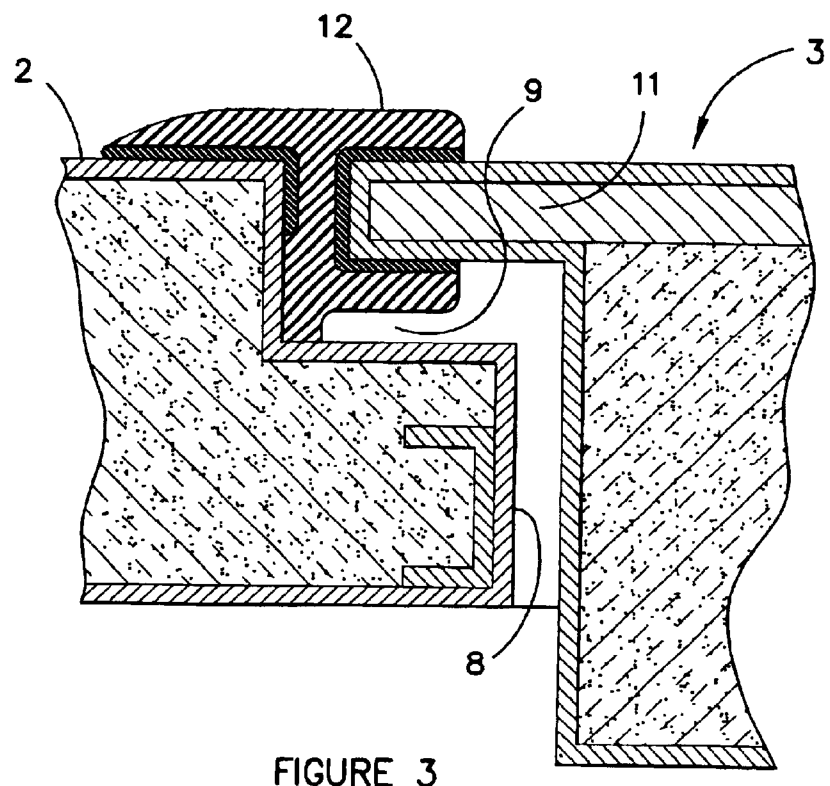
FIG. 3 shows a detail of the connection between the insulated housing and the refrigerator unit of FIG. 1.

The insulated housing 2 according to the embodiment of FIGS. 1 to 3 includes insulated side, bottom and top walls configured to generally conform to the shape required of a standard airfreight container. One end wall includes doors 4 which are kept closed by the latching mechanism 6.

There is a rectangular opening 7 in the top of the insulated housing 2. The peripheral edges 8 of the opening are countersunk at 9. A peripheral ledge 11 extends from the refrigerator unit 3 for supporting the refrigerator unit 3 on the countersunk edges 9. Six bolts and a deformable seal 12 retain the refrigerator unit 3 firmly in place in the opening 7 and aids in the insulation of the interior of the housing 2 from the external environment. Preferred materials for the seal 12 include butyl rubber and silicon rubber. The seal 12 is "test burn" rated as are all the components of the container.

Figure 4:
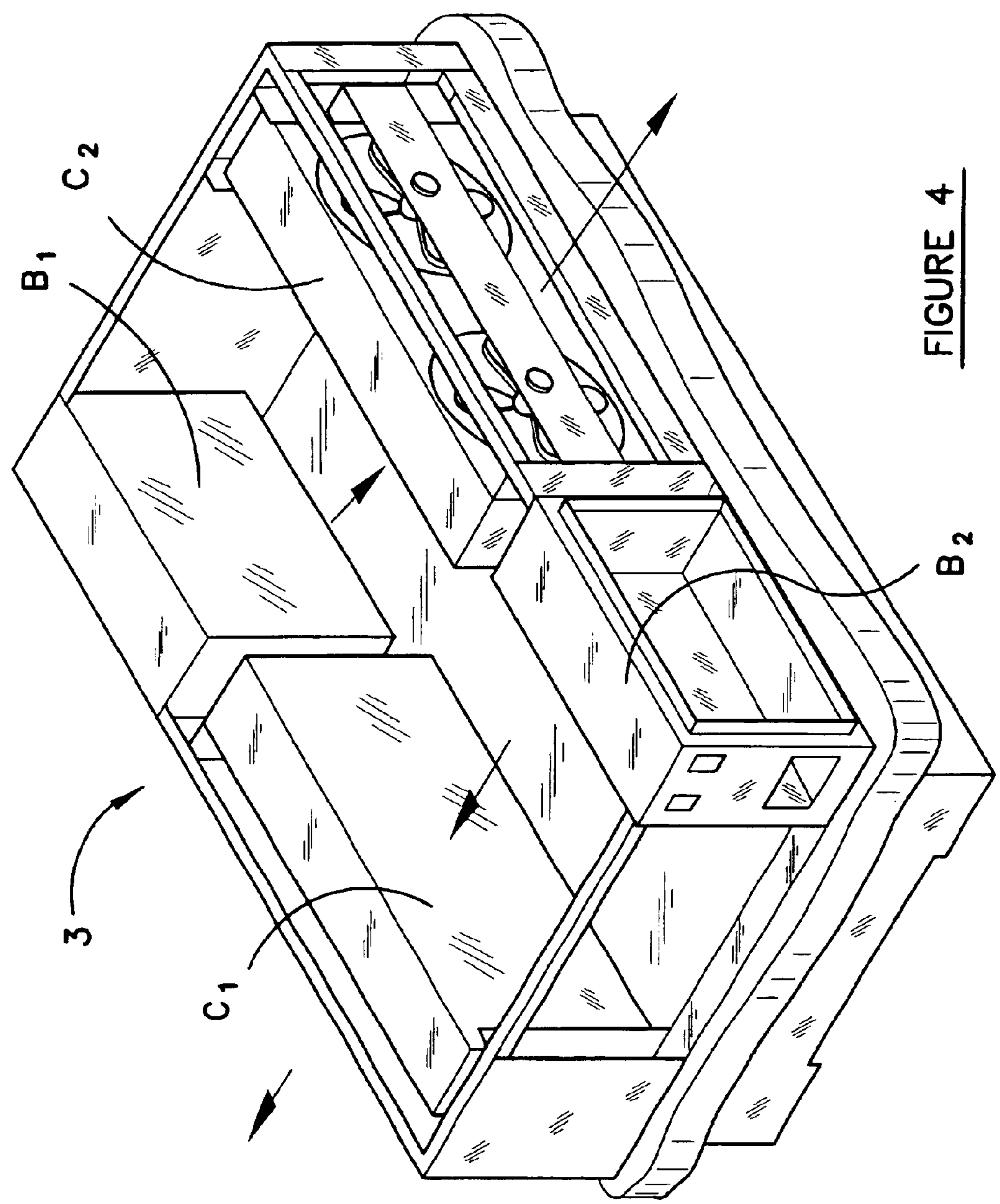
FIG. 4 shows details of the internal configuration of the refrigerator unit of FIG. 1.

The mounting of components within the refrigerator unit 3 is shown in FIG. 4. According to the present embodiment of the invention, the refrigerator unit 3 includes two refrigeration circuits. There are two condensers C1, C2, four fans and two electrical components boxes B1, B2 mounted within the refrigerator unit 3. There are two evaporator coils (not illustrated) and two fans (not illustrated) mounted on the underneath side of the refrigeration unit 3.

Valving (not illustrated) allows either or both of the condensers 11 to supply refrigerant to either or both of the condenser/evaporator pairs. Both of these refrigeration circuits are used for freezing, but only one of these circuits is used for chilling.

The present embodiment of the invention has two electrical power inlets. The first of these is adapted to plug into the Australian standard 240 volt/50 Hz mains power supply. The second of these power inlets is adapted to plug into the aircraft standard three phase 115 volt/400 Hz power supply. The supply from this second power inlet is rectified, and the rectifier supplies power to two independent converters. The converters each output power at 240 volts/50 Hz. Each of the converters powers one refrigeration circuit.

Figure 5:
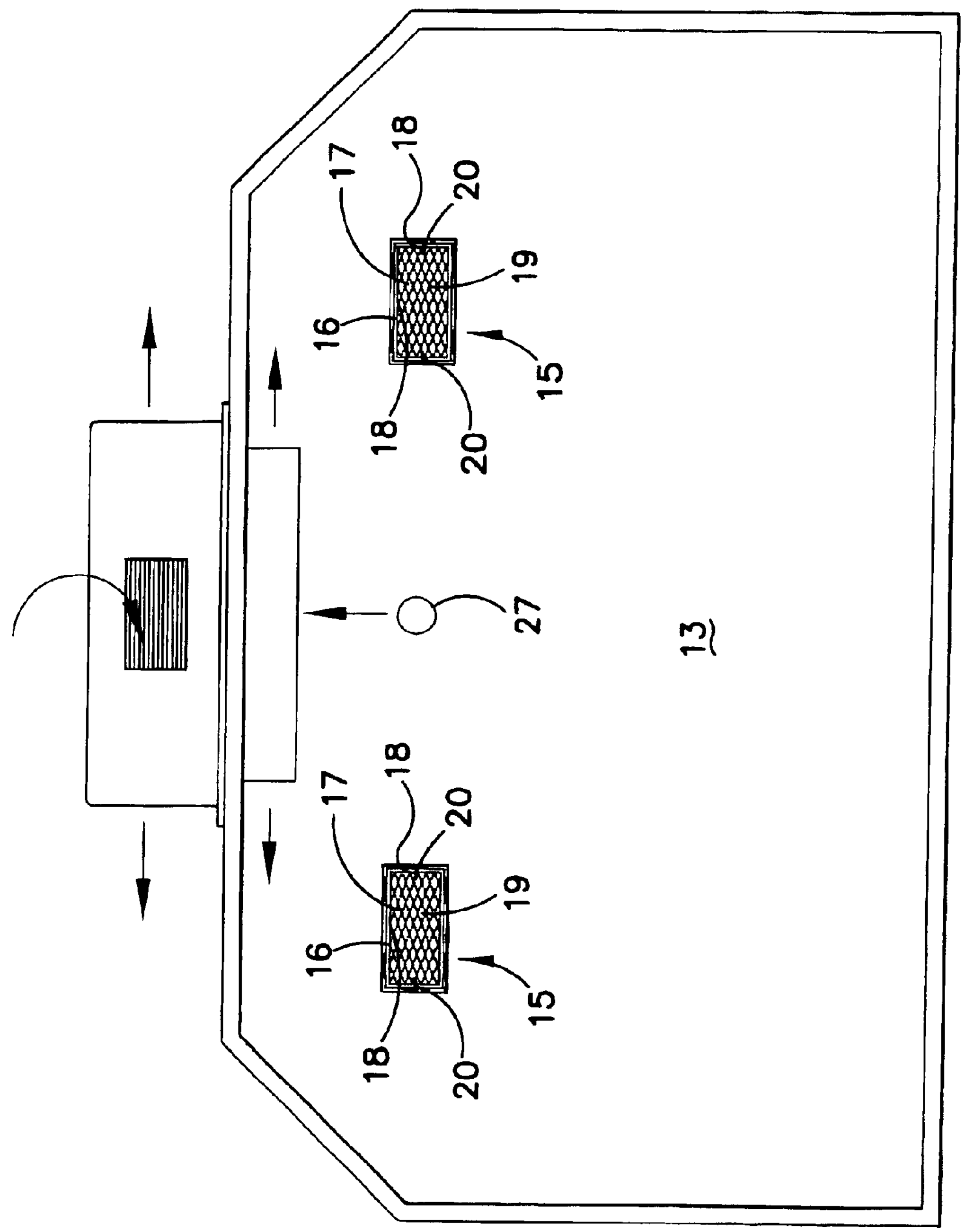
FIG. 5 is a rear view of the cooler shown in FIG. 1.
Figure 6:
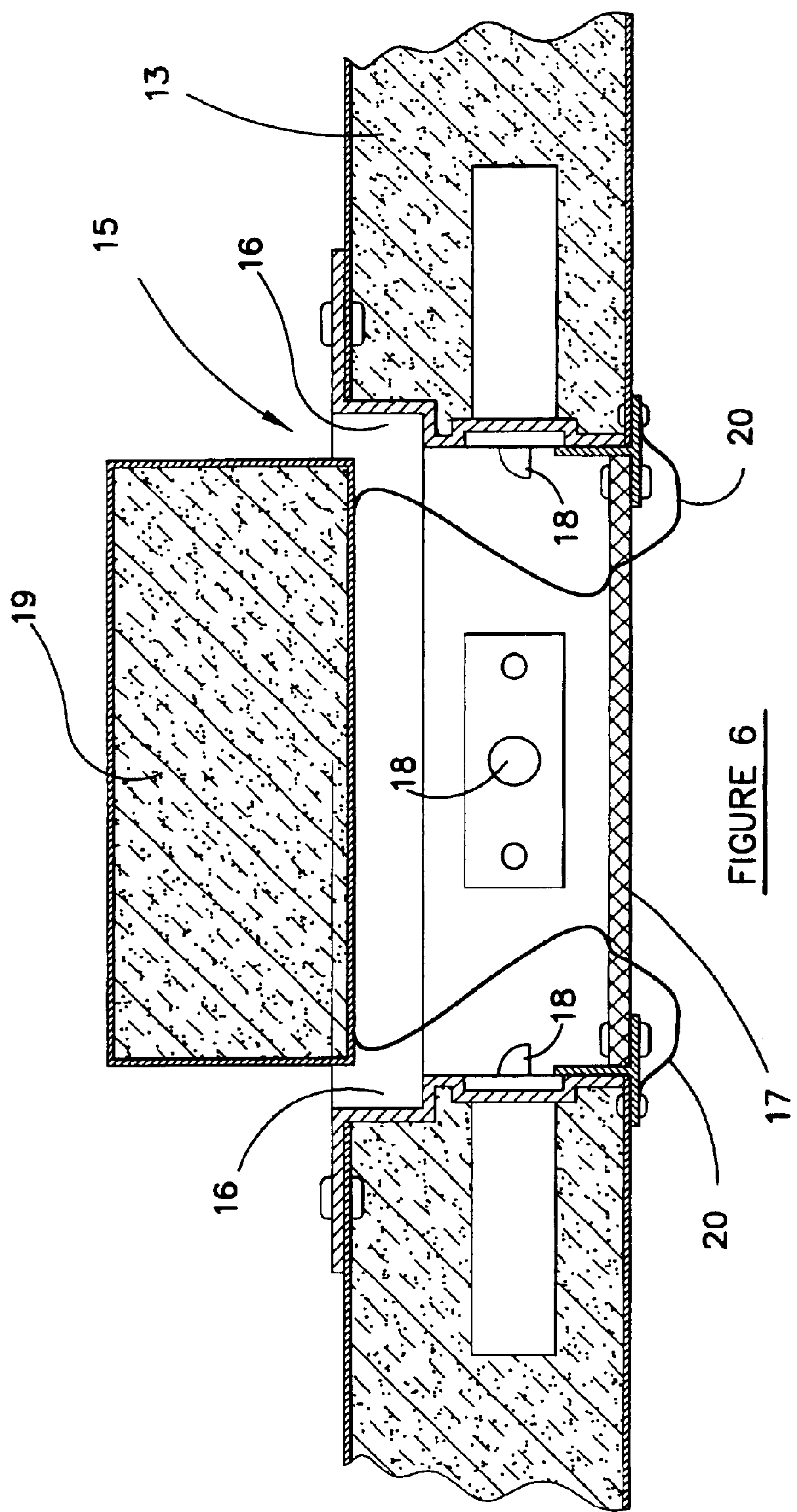
FIG. 6 is a section through the blowout panel.
Figure 7:
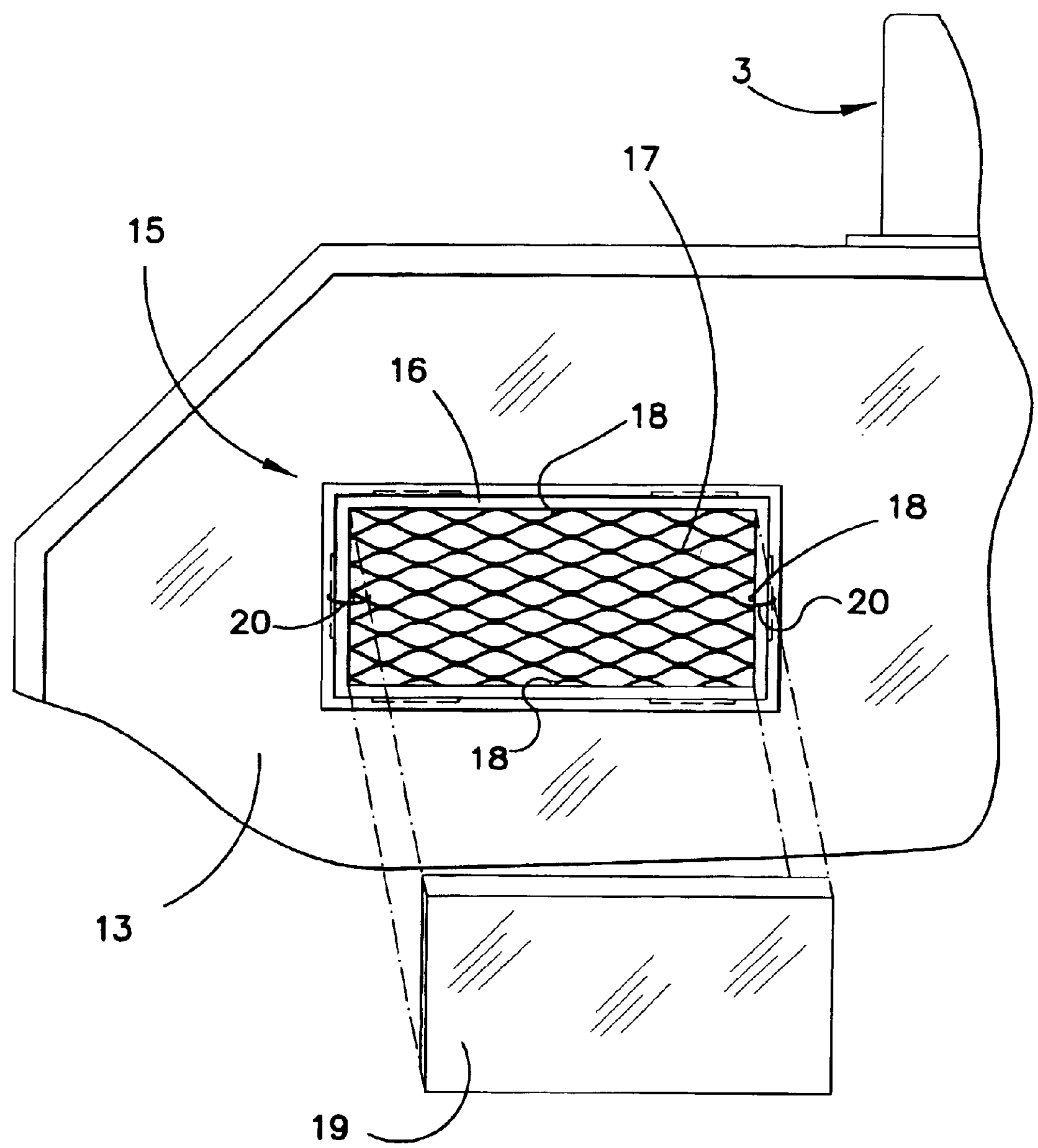
FIG. 7 is a close-up of the blow out panel shown in FIG. 5.

In FIGS. 5–7, the rearwall 13 has a pair of ducts 15 communicating with the refrigerated space inside the cooler. The duct casing has a continuous rebate 16 and the duct is closed by an intrusion barrier 17 to prevent theft of the contents. The barrier is a metal mesh riveted to the casing at the interior face of the cooler. The casing has six inset, spring loaded catches 18 which protrude into the duct. The duct is closed by a blow out 165×255 mm panel 19. The panel is made of the same material as the cooler wall and is pushed from the exterior, past the rebate 16 into the clasp of the catches 18. The panel is tethered to the casing by a pair of lanyards 20. These prevent loss of the panels in the cargo space if they blow out. This construction ensures that the panels blow out in 0.28 seconds if exposed to a pressure change of 2 psi between the container interior and the cargo space. Tethering the panels ensures the airframe and aircraft equipment remains undamaged. A 2 psi pressure difference equates to a force of 140 pounds on the panel.

Figure 8:
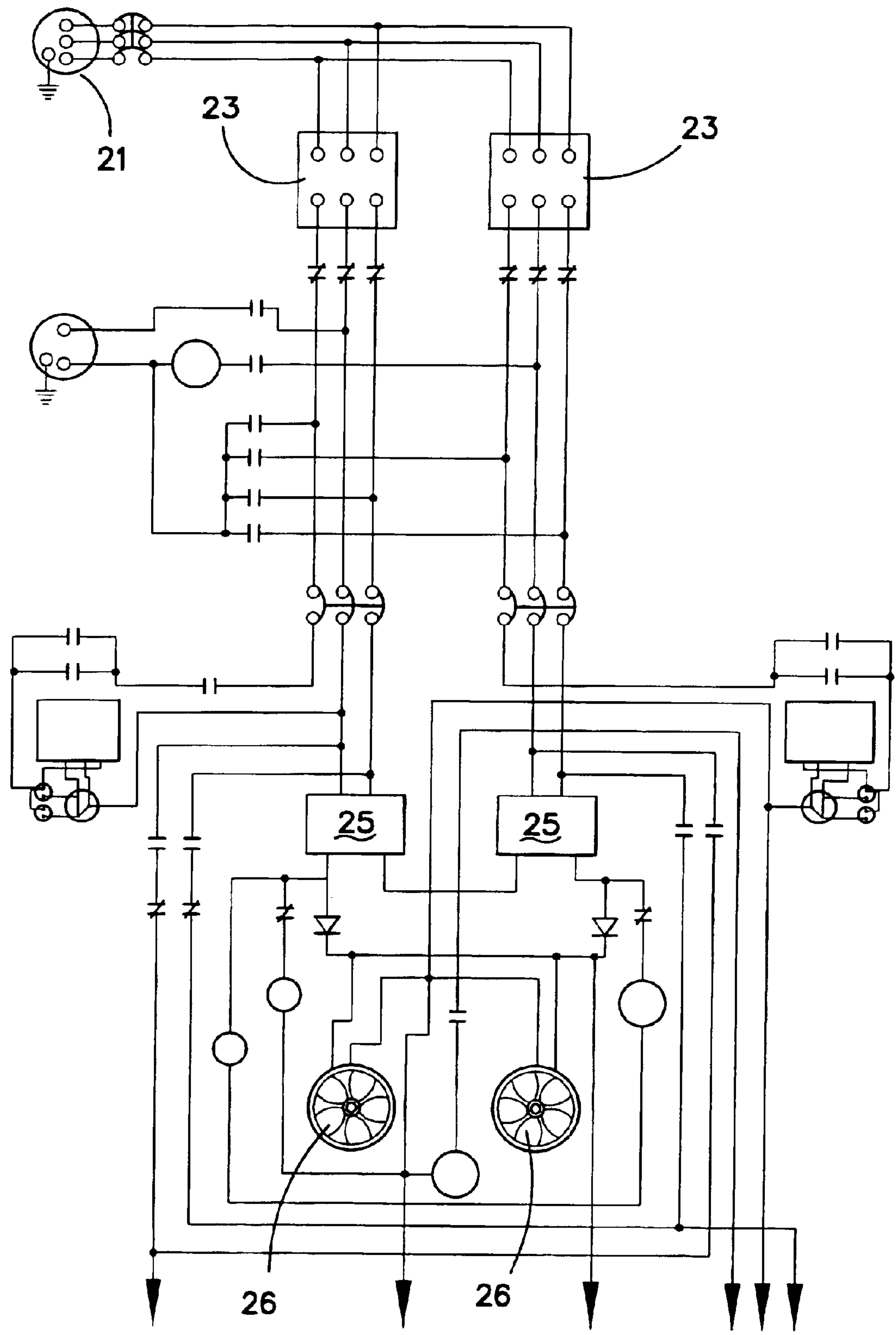
FIG. 8 is a front view of the intrusion barrier seen from the exterior of the cooler.
Figure 9:
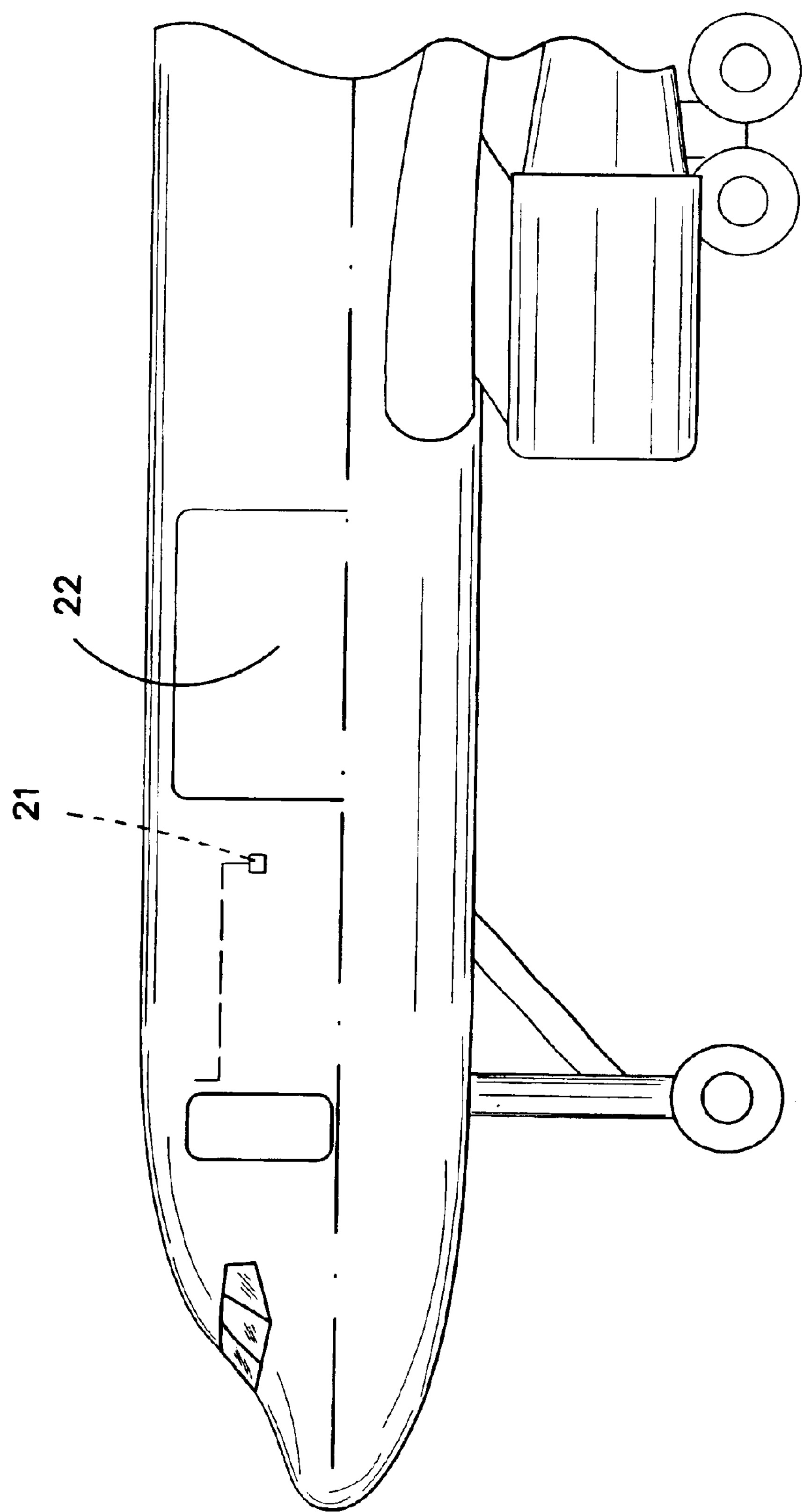
FIG. 9 is a block diagram of the power supply to be supplied by an aircraft or an airport.

Referring now to FIGS. 8 and 9, the galley of the Boeing 727 has 115 v/400 Hz supply from three 60A aircraft alternators which generate three phase supply. The three phase supply is taken from the galley supply through fitting 21 adjacent cargo space 22. The 3-phase supply serves a pair of P/N CNV400/500F converters 23 in the refrigeration unit 3. Each of the converters powers one compressor. The converters also supply power to two AC-DC 12 volt/DC converters and are then joined to a common circuit through diodes to feed the main refrigeration controller, which in turn distributes the selection of power to the other components as required by settings.

Whilst each converter has the capacity to run the complete system under full load, the electrical system has been designed such that should one converter fail or shut down, the system will still run on one compressor and drive other essential components.

The 240 volt/50 Hz or 115 volt/60 Hz airport supply reaches the refrigeration units via three pin plug 24. The single phase AC supply reaches twin converters P/N CNV220/12/15, 25 which rectify the supply, providing 12v dc for the two fans 26 in the refrigeration unit and the refrigeration control system.

The cargo space temperature is typically 4° C. The refrigeration unit's interior temperature may be −18° C. for meat such as beef or −22° C. for seafood but is capable of reaching −25° C. The heat pumped from the interior is released into the cargo space. A two way valve 27 allows slow equalisation of pressure such as occurs in routine changes in altitude or air expansion resulting from warm contents in the container.

According to alternative preferred embodiments of the invention (not illustrated), the invention has only one electrical power inlet. The supply from this one inlet is rectified and converted to an appropriate voltage and frequency to power the refrigeration circuits.

What is claimed is:

1. A refrigerated air freight container which includes:

an insulated housing having an interior region;

a refrigerator unit which is mounted on the housing for refrigerating the interior region of the housing, which refrigerator unit includes:

an electrically powered compressor which operates at a given power supply voltage and frequency;

evaporator means;

condenser means; and the refrigerator air freight container further including at least one voltage and frequency converter which converts received power at one of several voltages and at one of several frequencies to power at a voltage and frequency required to drive the compressor and which is constructed and arranged to receive airplane generated power in flight and ground generated electrical power on the ground, said converter being constructed and arranged to convert the airplane generated power and the ground generated power to power at the voltage and frequency required to drive the compressor, the housing defining a duct joining the interior region with the exterior surrounding the container, an insulated blow out panel which in use closes the duct and means in the duct to locate and retain the panel until a pressure difference between the exterior and the interior region overcomes the retention and displaces the panel.

2. A refrigerated air freight container as claimed in claim 1, wherein the range of voltages of the power received includes 240 volts and 115 volts.

3. A refrigerated air freight container as claimed in claim 1, wherein the range of frequencies of the power received includes 400 Hz, 60 Hz and 50 Hz.

4. A refrigerated air freight container as claimed in claim 1, wherein the voltage and frequency required to drive the compressor is 240 volts at 50 Hz.

5. A refrigerated air freight container as claimed in claim 1, wherein the refrigerator unit is removably mounted on the housing.

6. A refrigerated air freight container as claimed in claim 1, wherein the panel blows out in 0.20 seconds in response to a pressure difference of about 2 psi.

7. A refrigerated air freight container as claimed in claim 1, wherein the panel is tethered to the container.

8. A refrigerated air freight container as claimed in claim 1, wherein the duct is protected by an air permeable intrusion barrier which is inboard on the panel.

* * * * *